United States Patent
Colgan et al.

(10) Patent No.: US 8,954,712 B2
(45) Date of Patent: Feb. 10, 2015

(54) COMPUTER SYSTEM INCLUDING AN ALL-TO-ALL COMMUNICATION NETWORK OF PROCESSORS CONNECTED USING ELECTRICAL AND OPTICAL LINKS

(75) Inventors: Evan G. Colgan, Chestnut Ridge, NY (US); Monty M. Denneau, Brewster, NY (US); Daniel M. Kuchta, Patterson, NY (US)

(73) Assignee: International Business Machines Corporation, Armonk, NY (US)

( * ) Notice: Subject to any disclaimer, the term of this patent is extended or adjusted under 35 U.S.C. 154(b) by 523 days.

(21) Appl. No.: 13/313,145

(22) Filed: Dec. 7, 2011

(65) Prior Publication Data
US 2013/0151812 A1    Jun. 13, 2013

(51) Int. Cl.
*G06F 15/163* (2006.01)
*G06F 15/173* (2006.01)

(52) U.S. Cl.
CPC ........ *G06F 15/17337* (2013.01); *G06F 15/163* (2013.01)
USPC ........................ 712/29; 709/238; 712/E9.002

(58) Field of Classification Search
CPC ... G06F 15/161; G06F 15/163; G06F 15/173; G06F 15/17337; H04B 10/27; H04B 10/271
USPC .............. 709/238, 201, 250, 249; 712/28, 32
See application file for complete search history.

(56) References Cited

U.S. PATENT DOCUMENTS

| | | | | |
|---|---|---|---|---|
| 7,505,822 | B2 * | 3/2009 | Vishkin | 700/90 |
| 7,689,129 | B2 * | 3/2010 | Karashima et al. | 398/164 |
| 2006/0173983 | A1 * | 8/2006 | Naito et al. | 709/223 |

OTHER PUBLICATIONS

R. Fiedler et al., "Early Access to the Blue Waters Sustained Petascale System," Blue Waters Sustained Petascale Computing, http://www.ncsa.illinois.edu/BlueWaters/pdfs/webinar_Prospective_PRAC.pdf, Apr. 2010, 38 pages.
A. Gara et al., "Overview of the Blue Gene/L System Architecture," IBM Journal of Research and Development, Mar. 2005, pp. 195-212, vol. 49, No. 2.3.

* cited by examiner

*Primary Examiner* — Kenneth Kim
(74) *Attorney, Agent, or Firm* — Louis J Percello; Ryan, Mason & Lewis, LLP

(57) ABSTRACT

Node Interconnect architectures to implement a high performance supercomputer are provided. For example, a node interconnect architecture for connecting a multitude of nodes (or processors) of a supercomputer is implemented using an all-to-all electrical and optical connection network which provides two independent communication paths between any two processors of the supercomputer, wherein a communication path includes at most two electrical links and one optical link.

18 Claims, 8 Drawing Sheets

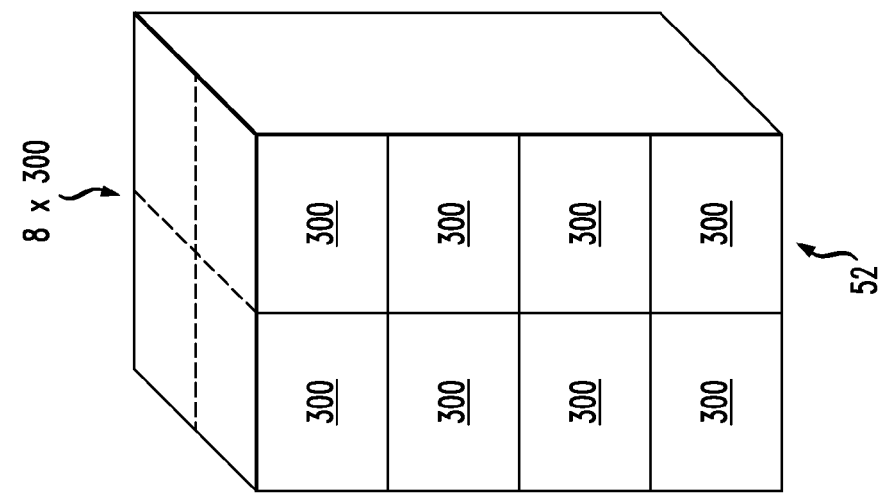
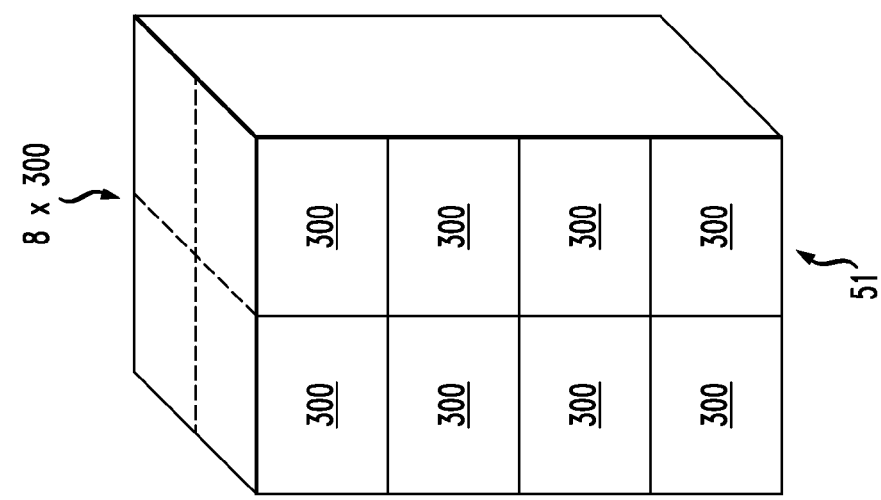
FIG. 5

US 8,954,712 B2

COMPUTER SYSTEM INCLUDING AN ALL-TO-ALL COMMUNICATION NETWORK OF PROCESSORS CONNECTED USING ELECTRICAL AND OPTICAL LINKS

STATEMENT REGARDING FEDERALLY SPONSORED RESEARCH OR DEVELOPMENT

This invention was made with Government support under Contract No. H98230-08-C-1468 awarded by MPO. The Government has certain rights in this invention.

TECHNICAL FIELD OF THE INVENTION

The present invention relates generally to node interconnect architectures to implement a high performance supercomputer and, more specifically, an interconnect architecture for connecting a multitude of nodes (or processors) of a supercomputer using an all-to-all electrical and optical connection network which provides two independent communication paths between any two processors of the supercomputer, wherein a communication path includes at most two electrical links and one optical link.

BACKGROUND OF THE INVENTION

A key issue in the design of supercomputers is in the design of the network that connects the multitude of computing nodes (or processors) that form the supercomputer. In the network design, it is desirable to build a network that provides a low-latency and high bandwidth connection between all processors of the supercomputer, with acceptable power and cost. A general approach in current generation supercomputers is to electrically connect as many nodes as possible, generally with a common board or backplane, and then use optical connections between these units to form the overall network.

SUMMARY OF THE INVENTION

Exemplary embodiments of the invention generally include node interconnect architectures to implement a high performance supercomputer and, more specifically, an interconnect architecture for connecting a multitude of nodes (or processors) of a supercomputer using an all-to-all electrical and optical connection network which provides two independent communication paths between any two processors of the supercomputer, wherein a communication path includes at most two electrical links and one optical link.

For example, in one exemplary embodiment, a computer system includes a plurality of multi-processor modules and a plurality of optical redistribution boxes. Each multi-processor module includes a plurality of processors packaged together such that all of the processors in a given multi-processor module are electrically connected to each other in an all-to-all electrical connection network. The plurality of optical redistribution boxes are optically coupled to the plurality of multi-processor modules to provide an all-to-all communication network in which a communication path between any processor of one of the plurality of multi-processor modules and another processor of another one of the multi-processor modules includes at most two electrical links and one optical link.

In another exemplary embodiment of the invention, a computer system includes a local cluster, and one or more remote clusters. The local cluster includes a local optical redistribution box, and a local node having M local processors. Each remote cluster includes a remote optical redistribution box, and a remote node having M second local processors.

The local optical redistribution box includes N local optical connectors, wherein each local optical connector is connected to one of N local optical bundles, wherein each local optical bundle includes N local duplex pairs, wherein each local duplex pair includes a transmit and receive link. The local optical redistribution box further includes N remote optical connectors, wherein each remote optical connector is connected to one of N remote optical bundles, wherein each remote optical bundle includes N remote duplex pairs, wherein each remote duplex pair includes a transmit and receive link. Each of the N local optical bundles is connected to one of M/2 local processors of the local node.

The remote optical redistribution box includes N second local optical connectors, wherein each second local optical connector is connected to one of N second local optical bundles, wherein each second local optical bundle includes N second local duplex pairs and wherein each second local duplex pair includes a second local transmit and second local receive link. The remote optical redistribution box further includes N second remote optical connectors, wherein each second remote optical connector is connected to one of N second remote optical bundles, wherein each second remote bundle includes N remote second duplex pairs, wherein each second remote duplex pair includes a second remote transmit link and second remote receive link. Each of the N second local optical bundles is connected to one of M/2 second local processors of the remote node.

These and other exemplary embodiments, features, aspects and advantages of the present invention will become apparent from the following detailed description of illustrative embodiments thereof which is to be read in connection with the accompanying drawings.

BRIEF DESCRIPTION OF THE DRAWINGS

FIG. 5 is a schematic view of a three rack group that is formed using a plurality of backplane modules and optical redistribution modules, according to an exemplary embodiment of the invention.

DETAILED DESCRIPTION OF EXEMPLARY EMBODIMENTS

Exemplary embodiments of the invention will now be described in further detail with regard to interconnect architectures for connecting a multitude of nodes (or processors) of a supercomputer system using an all-to-all electrical and optical connection network which provides two independent communication paths between any two processors of the supercomputer system. The term "communication path" as used herein denotes a total of "electrical links" and/or "optical links" between any two processors in the supercomputer system. The term "electrical link" as used herein denotes a total of electrical wire connections between two processors of a given multi-processor module. The term "optical link" as used herein denotes an optical transmitter (TX) module, an optical receiver (RX) module, and a total of passive optical fiber ribbons/jumpers connecting the optical TX module and optical RX module between two processors of different multi-processor modules. An "optical link" (as that term is used herein) also includes the short electrical connections/interface between the processor modules and the optical TX and RX modules. Illustrative examples of optical links and electrical links will be discussed in further detail below with reference to FIGS. 4 and 7, for example.

Figure 1:
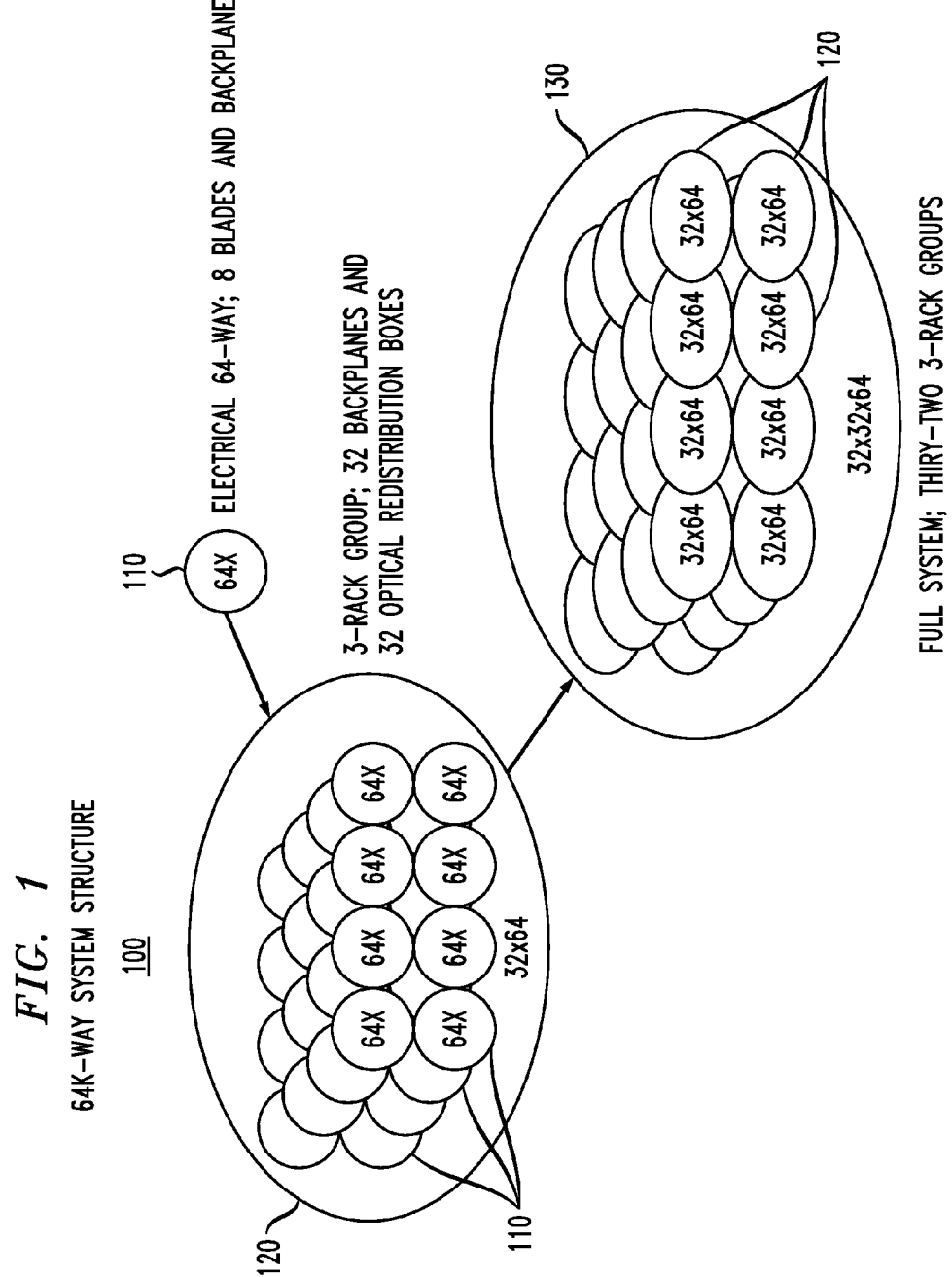
FIG. 1 is a schematic representation of a 64K way all-to-all super computer system framework according to an exemplary embodiment of the invention.

For illustrative purposes, exemplary embodiments of the invention will be discussed with regard to an interconnect framework for providing a 64K, processor all-to-all network (where 64K means 65,536 or $2^{16}$ processors). It should be understood, however, that the invention is not limited to use with such a particular arrangement. The invention is instead more generally applicable to any supercomputer configuration in which it would be desirable to link any one of a multitude of processors to any other processor in the system with a communication path that includes at most a single optical link and two electrical links FIG. 1 is a schematic representation of a 64K-way all-to-all supercomputer system framework according to an exemplary embodiment of the invention. In general, the system framework 100 comprises 64K processors electrically and optically connected through three levels of packaging. A first package level includes a 64-way multi-processor module 110 (referred to herein as a "backplane module" or "backplane"). The backplane module 110 includes 64 processors that are electrically connected to each other in an all-to-all electrical connection network. An exemplary embodiment of a backplane module and constituent components thereof will be discussed in further detail below with reference to FIGS. 2, 3 and 4.

In a second package level, a plurality of the multi-processor modules 110 are packaged into a computing group 120, which is referred to herein as a "three-rack group." In one exemplary embodiment of the invention, a computing group 120 comprises 32 optically connected 64-way backplane modules 110, comprising a total of 2048 processors within a group, and 32 optical redistribution modules. An exemplary embodiment of a computing group 120 will be discussed in further detail below with reference to FIGS. 5 and 6.

In a third package level, a plurality of computing groups 120 are optically connected to form a supercomputer system 130. In one exemplary embodiment of the invention, the supercomputer system 130 comprises 32 connected computing groups 120 providing 1024 optically connected 64-way backplane modules. In particular, the supercomputer system 130 comprises 65,536 processors (32×32×64), wherein processors packaged together in the same backplane module 110 can communicate with each other using a communication path that includes a single electrical link and wherein any processor in any given backplane module 110 can communicate with any other processor of another backplane module 110 using a communication path that includes at most two electrical links and one optical link. In other words, the node interconnect framework of the supercomputer system 130 creates a 64K-way all-to-all network wherein any two processors can communicate over a communication path that includes a minimum of one electrical link (between any two processors of the same backplane module) or a maximum of two electrical links and one optical link (between any two processors of different backplane modules).

Figure 2:
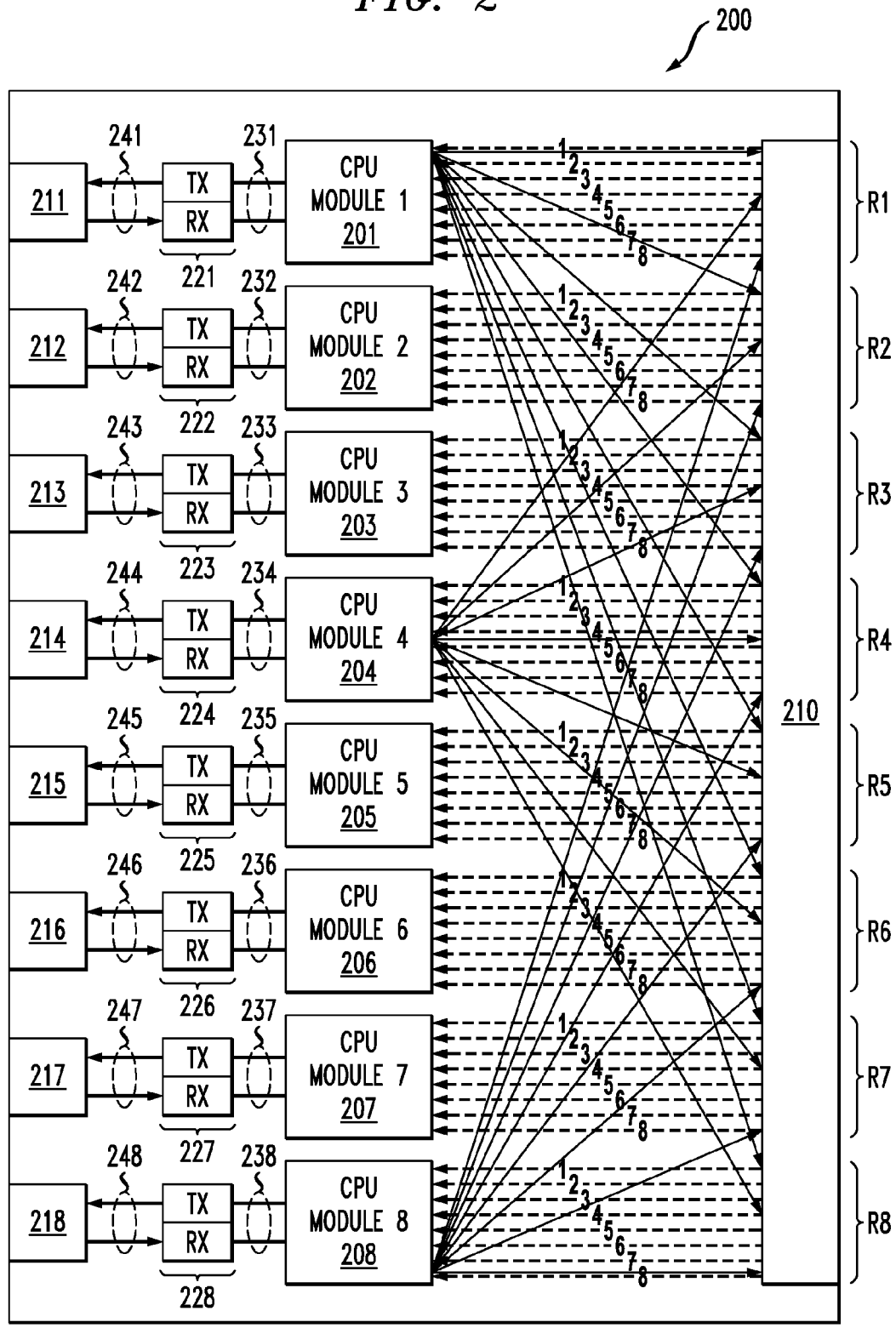
FIG. 2 is a schematic illustration of a multi-processor module (or "blade module") according to an exemplary embodiment of the invention.
Figure 3:
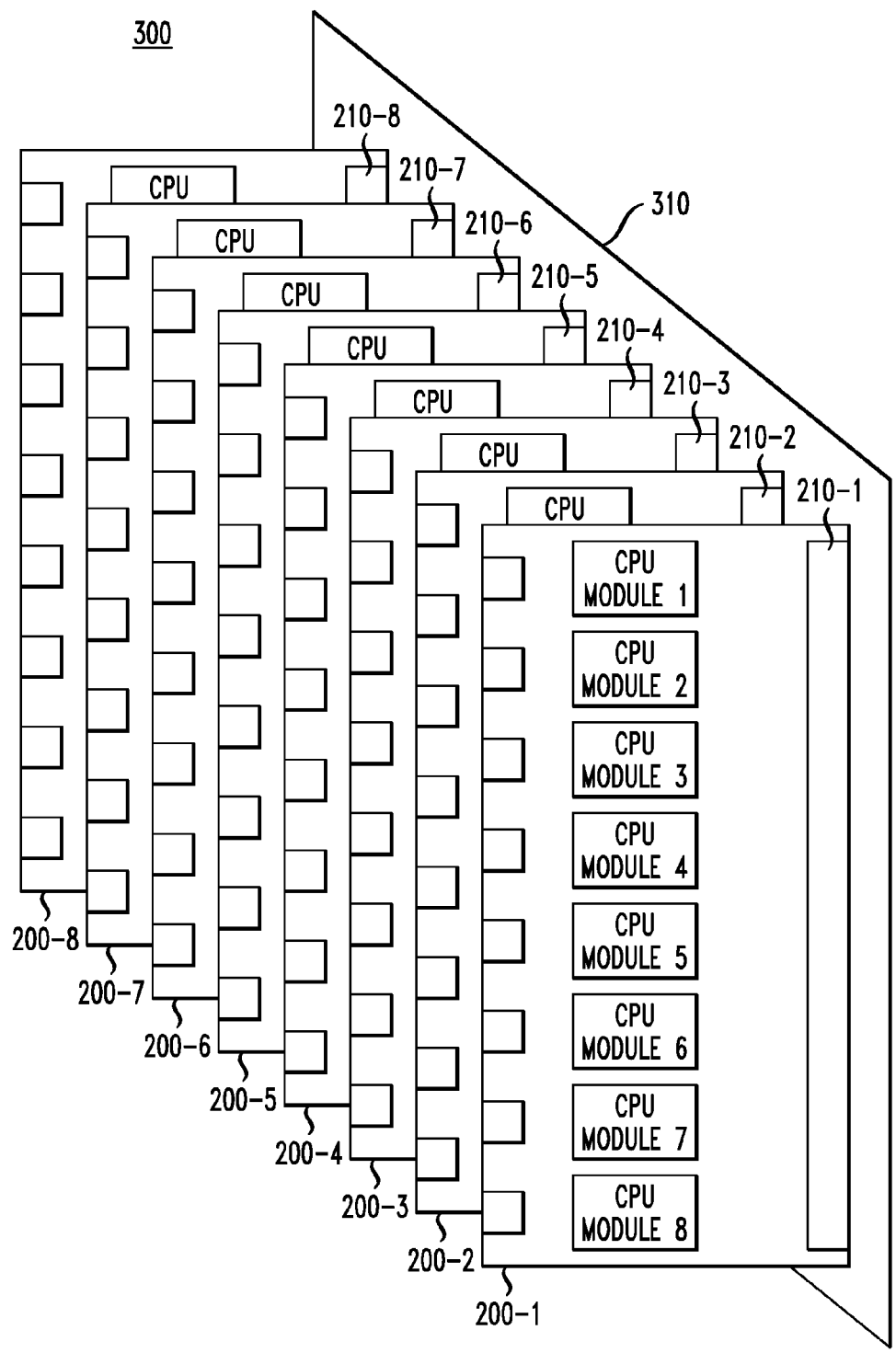
FIG. 3 is a schematic illustration of a multi-processor module (or "backplane module") which is formed of eight blade modules, according to an exemplary embodiment of the invention.

An exemplary embodiment of a backplane module and constituent components thereof will now be discussed in further detail with reference to FIGS. 2, 3 and 4. FIG. 2 is a schematic illustration of a multi-processor module ("blade module") according to an exemplary embodiment of the invention, which may be utilized to form a backplane module as shown in FIG. 3. In particular, FIG. 2 schematically illustrates a blade module 200 which comprises a plurality of processors packaged together on a circuit board. In the exemplary embodiment of FIG. 2, the blade module 200 comprises 8 processor modules 201, 202, 203, 204, 205, 206, 207 and 208, which are electrically connected to a backplane connector 210 and optically connected to optical connectors 211, 212, 213, 214, 215, 216, 217 and 218, respectively. More specifically, each processor module 201, 202, 203, 204, 205, 206, 207 and 208 is electrically coupled to a corresponding optical transmitter (TX)/receiver (RX) module 221, 222, 223, 224, 225, 226, 227, and 228, via respective short electrical connections 231, 232, 233, 234, 235, 236, 237, and 238. The optical TX/RX modules 221, 222, 223, 224, 225, 226, 227, and 228 are optically coupled to the optical connectors 211, 212, 213, 214, 215, 216, 217 and 218, respectively, via respective optical fibers 241, 242, 243, 244, 245, 246, 247, and 248.

A plurality of the blade module 200 shown in FIG. 2 can be packaged to form a multi-processor module, such as illustrated in FIG. 3. In particular, FIG. 3 is a schematic illustration of a backplane module 300 according to an exemplary embodiment of the invention, which is constructed by connecting 8 blade modules 200-1, 200-2, 200-3, 200-4, 200-5, 200-6, 200-7 and 200-8 to a common backplane connector board 310. The backplane connector board 310 provides electrical connections between the different blade modules 200-1~200-8 connected thereto, and provides DC voltage to power the blade modules 200-1~200-8 and a service card (not specifically shown) which is plugged into the backplane connector board 310. The service card provides the "infrastructure" connections (e.g., front-end system links, RAS, clock, and other auxiliary signals) to the blade modules 200-1~200-8 on the backplane 310. The electrical wiring (not specifically shown in FIG. 3 for illustrative clarity) on each blade module 200-1~200-8 and on the backplane connector board 310 form a 64-way all-to-all electrical network, as will be explained now in further detail with reference to FIGS. 2 and 4.

Referring back to FIG. 2, a plurality of electrical connections are formed on the blade module 200 between the various processors 201~208 and the backplane connector 210. In particular, FIG. 2 shows one set of 8 wires (dotted arrows labeled 1-8) connected horizontally from the backplane connector 210 to each processor 201~208 (inbound wiring). Each of the dotted arrows represents seven differential wire pairs that operate up to twelve Gb/s (Gigabits per second), such that fifty-six inbound differential pairs are wired horizontally to each processor module 201~208 from the backplane connector 210. Moreover, from each processor module 201~208, there are 8 wires (solid arrows) connected to a corresponding one of eight different regions (R1, R2, R3, R4, R5, R6, R7, R8) on the backplane connector 210 (outbound wiring), where each region R1, R2, R3, R4, R5, R6, R7, R8 is aligned horizontally with a respective one of the processor modules 201, 202, 203, 204, 205, 206, 207, 208. For purposes of clarity, FIG. 2 only shows the outbound wiring from the processor modules 201, 204 and 208 to the backplane connector 210. Each of the solid arrows (outbound wiring) connected from a given processor module to a given region on the backplane connector 210 represents seven differential pairs that operate up to twelve Gb/s, such that fifty-six outbound differential pairs are wired from each processor module 201~208 to respective regions R1~R8 on the backplane connector 210.

As noted above, the backplane connector board 310 (shown in FIG. 3) provides electrical connections between each of the backplane connectors 210 of the various blade modules 200-1~200-8 connected thereto. On a given blade module, for each outbound wire (solid arrow) which includes seven outbound differential pairs that extend from a given processor module to a given region Ri on the backplane connector 210, the backplane connector board 310 connects each one of the seven differential pairs to the same region Ri on the backplane connector 210 of each of the other 7 blade modules. For example, referring to FIG. 2, the solid arrow that extends from the first CPU module 201 to the first region R1 on the backplane connector 210 includes 7 differential pairs of wiring, wherein each differential pair is connected to the same region R1 on a respective one of the other 7 blade modules (which are packaged in the backplane module 300) via wiring on the backplane connector board 310.

Moreover, on a given one of the blade modules, for the fifty-six inbound differential pairs of wires (dotted lines 1-8) extending horizontally from a given region Ri of the backplane connector 210 to a given processor module, the backplane connector board 310 provides connections to each of the 56 other processor modules present on the other 7 blade modules. For example, referring to FIG. 2, each of the eight dotted arrows (1~8) that extend from the first region R1 on the backplane connector 210 to the first CPU module 201 include 7 differential pairs of wiring that connect to a given one of the corresponding processors on the other 7 blade modules (which are packaged in the backplane module 300) via wiring on the backplane connector board 310. By way of specific example, the first dotted line 1 extending from the first region III to the first CPU module 201 provides connections from each of the other first level CPUs 201 on the other 7 blade modules, the second dotted line 2 extending from the first region R1 to the first CPU module 210 provides connections from each of the other second level CPUs 202 on the other 7 blade modules, etc. In this regard, the backplane 310 comprises eight groups of all-to-all wiring where there is one group for each of the eight "levels" of CPU modules 201~208.

Moreover, although not specifically shown in FIG. 2 for illustrative clarity, each blade module 200 includes all-to-all wiring between each of the eight CPU modules 201~208 that are mounted on the given blade module 200. In this regard, the combination of the wiring on each blade module 200-1~200-8 and on the backplane connector board 310 provides a 64-way all-to-all electrical connection between every one of the 64 CPU modules packaged together in the backplane module 300. The total of electrical wiring on the blade modules and backplane connector board 310, which connects two CPU modules in the same backplane module 300, comprises an "electrical link", as defined herein. The electrical wiring provided by the combination of the blades and the backplane can be understood by considering the example communication paths shown in FIG. 4.

Figure 4:
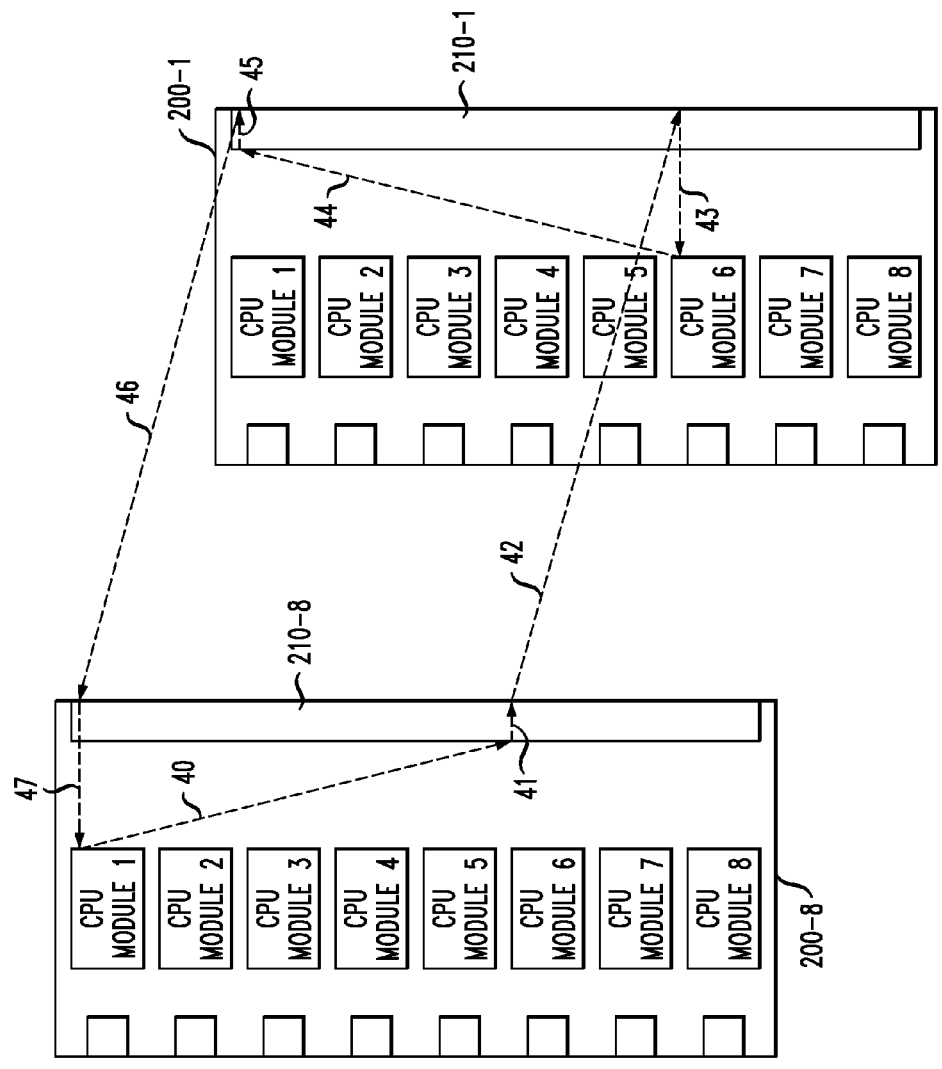
FIG. 4 schematically illustrates a method for electrical communication between different processors in different blade modules within a given backplane module, according to an exemplary embodiment of the invention.

In particular, FIG. 4 schematically illustrates a method for electrical communication between different processors in different blade modules of the backplane module 300, according to an exemplary embodiment of the invention. For purposes of illustration, FIG. 4 depicts an example communication between the first CPU module 1 on one blade module 200-8 and the sixth CPU module 6 on another blade module 200-1. As shown in FIG. 4, a signal is sent from the CPU module 1 (on blade module 200-8) on the outbound wire 40 diagonally down to the level of the sixth CPU module 6 (region 116) on the backplane connector 210-8. The signal is then transmitted via connection 41 across the backplane connector 210-8 to the backplane board 310 of the backplane module 300, where the signal is then sent across the backplane connector board 310 via connection 42 to the backplane connector 210-1 of the blade module 200-1 at the level of the sixth CPU module 6 (region R6. The signal is then transmitted horizontally from the backplane connector 210-1 via inbound wire 43 to the target CPU module 6. In this example, the electrical connections 40, 41, 42, and 43 connecting the CPU module 1 to the CPU module 6 comprise an "electrical link".

FIG. 4 further depicts a return path of a return signal sent from the CPU module 6 on blade 200-1 to the CPU module 1 on blade 200-8. The return signal is transmitted along outbound wire 44 from the CPU module 6 to region R1 of the backplane connector 210-1. The return signal is then transmitted via connection 45 across the backplane connector 210-1 to the backplane board 310 of the backplane module 300, where the return signal is then sent across the backplane connector board 310 via connection 46 to region R1 of the backplane Connector 210-8 of the blade module 200-8 at the level of the first CPU module 1. The return signal is then transmitted horizontally from the backplane connector 210-8 via inbound wire 47 to the target CPU module 1. In this example, the electrical connections 44, 45, 46, and 47 connecting the CPU module 6 to the CPU module 1 comprise an "electrical link". Similar paths are provided between all 64 CPU modules packaged together in the backplane module 300.

As noted above, in addition to the electrical wiring, the blade module of FIG. 2 includes a plurality of optical components and circuitry enabling optical communication between processors of different backplane modules. In particular, as described above, each blade module comprises a plurality of optical modules 221~228 that are coupled to respective processor modules 201~208 via respective short electrical connections 231~238, and optical fiber ribbons 241~248 that connect the optical TX and RX modules 221~228 to the optical connectors 211~218. As shown in FIG. 2, the optical modules 221~228 can be separate components that are attached to the blade module circuit board via micro-LGA, for example. In an alternate embodiment, the optical interface could be implemented in a silicon nanophotonic technology and integrated on the same integrated circuit chip as the processor.

Moreover, although only one optical TX and RX module is shown for each processor for illustrative purposes, in one exemplary embodiment, each CPU module 201~208 can be interconnected with six optical modules, 3 optical TX modules and 3 optical RX modules, which are arranged as two columns of three, and each of the 6 optical TX/RX modules providing 12 optical channels at 10 Gb/s per channel. In an alternate embodiment, the optical modules could be implemented as transceivers, transmitter and receiver in the same package, and arranged in a single column or implemented as a single device.

The optical fiber connections 241~248 may be implemented using any suitable fiber ribbon connectors/splitters to thereby provide an optical ribbon fiber path between the corresponding optical TX/RX modules 221~228 and optical bulkhead connectors 211~218. By way of example, in an exemplary embodiment as noted above where each CPU module 210~208 is connected to 6 optical modules (3 optical TX and 3 optical RX modules), a group of six non ruggedized 1×12 ribbon fibers can be connected to the optical connectors and routed to a point where they clear the optical modules, where the ribbon fibers either go directly to an optical bulkhead connector or are rotated/twisted into the correct orientation to be connected to the optical bulkhead connectors. The ribbon fibers may be part of "Y" splitter cables which combine the ribbon fibers from one optical TX module and one optical RX module so that each of the 2×12 ribbon fibers used outside of the blades contains twelve duplex 10 Gb/s links. In an alternate embodiment where the optical interface is implemented as a single 12 channel transceiver, the connection to the optical bulkhead is a single 24 fiber jumper. The combination of the three 2×12 optical cables from each CPU module is referred to as an optical bundle and consists of 72 optical fibers.

As mentioned above, a second package level is formed by packaging a plurality of backplane modules 300 into a computing group, which is referred to herein as a "three-rack group." FIG. 5 is a schematic view of a three rack group 50 that is formed using a plurality of backplane modules and optical distribution modules, according to an exemplary embodiment of the invention. The three-rack group 50 comprises a first compute rack 51, a second compute rack 52, and a local optical redistribution rack 53. In an exemplary embodiment, a full 64K-way supercomputer system comprises 32 three-rack groups 50. Each compute rack 51 and 52 comprises 16 backplane modules packaged as two wide and four tall arrays in both the front and back faces of each compute rack 51, 52, as schematically depicted in FIG. 5. In an exemplary embodiment where each backplane module comprises eight blade modules, each compute rack 51 and 52 includes 128 blade modules, or 1,024 processor modules per compute rack. Therefore, each three-rack group 50 comprises 32 backplane modules, or 256 blade modules, or 2,048 processor modules.

Figure 6:
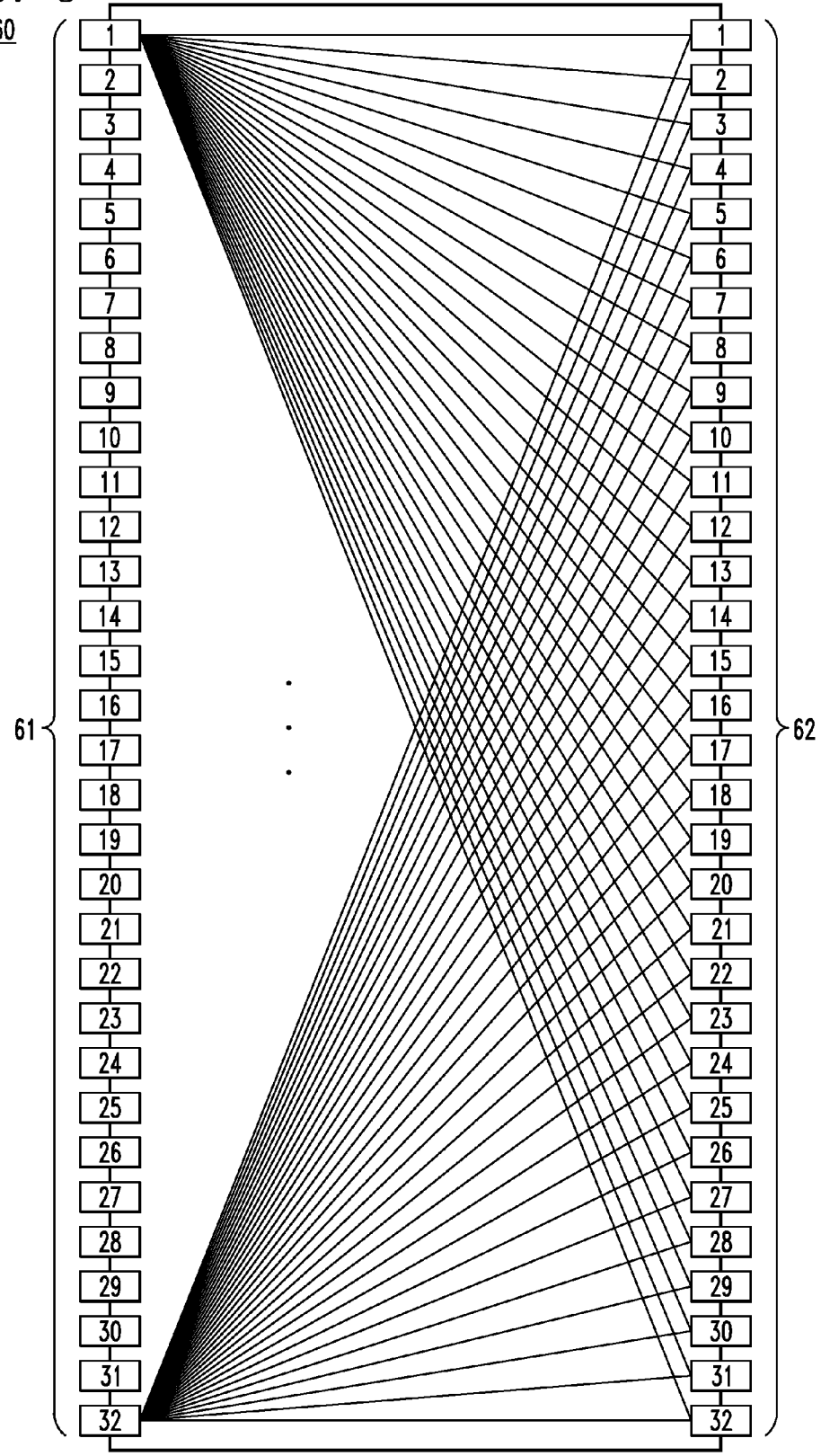
FIG. 6 schematically represents an optical redistribution module to provide optical communication links between different backplane modules in a supercomputer system, according to an exemplary embodiment of the invention.

The optical redistribution rack 53 comprises 32 optical redistribution modules 60-0, . . . , 60-31, wherein each optical redistribution box provides a 32×32 optical shuffle, which is illustrated schematically in FIG. 6. More specifically, FIG. 6 schematically represents an optical redistribution module 60 to provide optical communication links between different backplane modules in a supercomputer system, according to an exemplary embodiment of the invention. The optical redistribution box 60 comprises local connectors 61 for making optical connections to the backplanes in the local compute racks 51 and 52 (via local optical bundles), and global connectors 62 for making optical connections to backplanes in remote compute racks (via global optical bundles). On the local side, there are 32 local optical bundles (one bundle from each of the 32 backplane modules packaged in the compute racks 51 and 52 of a given, three rack group 50) which are connected to respective local connectors 61 of the optical redistribution box 60 in the given three rack group 50. The 32 optical bundles connected to the local connectors 61 are redistributed into 32 global optical bundles, which are output from the global optical connectors 62. Each global optical bundle contains a fiber pair (TX and RX) from each of the 32 backplanes in the three rack group 50, whereby each fiber bundle includes 64 active fibers, providing 32 duplex 10 Gb/s links. In a practical application, as noted above, each bundle comprises three 2×12 optical fiber cables so that standard components and connectors can be used, but of the 72 fibers, only 64 fibers are actively used in the configuration.

More specifically, FIG. 6 schematically illustrates the optical redistribution connections from the inputs 1 and 32 on the local input side 61 to each of the global outputs 1-32 on the global output side 62, For example, the local input 1 receives one optical bundle from one of the 32 backplane modules and redistributes the optical connections to the 32 global outputs 62. Each lines shown in the optical redistribution box 60 includes 2 optical fibers, providing a duplex 10 Gb/s optical link. For purposes of clarity, FIG. 6 only illustrates the optical connections from the inputs 1 and 32 on the local side 61 to the global outputs 1-32 on the global side 62. Thirty-two optical bundles, one bundle from each of the 32 64-way backplane modules in the three rack group, are connected to the local input side 61 of the optical redistribution box 60 and these are redistributed into 32 global optical bundles at each of the global outputs 62 such that each global optical bundle includes a fiber pair (TX and RX) from each of the backplane modules in the three rack group. Each global optical bundle, comprising 64 active fibers, includes 32 duplex 10 Gb/s links.

Each compute rack 51 and 52 sends 512 local optical bundles to its optical redistribution rack 53, and each compute rack 51 and 52 receives 512 global optical bundles from the optical redistribution racks in the system. To be more specific, each compute rack 51 and 52 receives 16 global optical bundles from its local optical redistribution rack 53 and 496 global optical bundles from other optical redistribution racks in the system. In this regard, each optical redistribution rack 53 receives 1024 local optical bundles and sends 1024 global optical bundles out, one to each 64-way backplane module in the full system. In this regard, the 64K-way all-to-ail network, is constructed from 1024 64-way backplane modules that are organized as 32 three-rack groups where each three-rack group contains 32 64-way backplanes.

Figure 7:
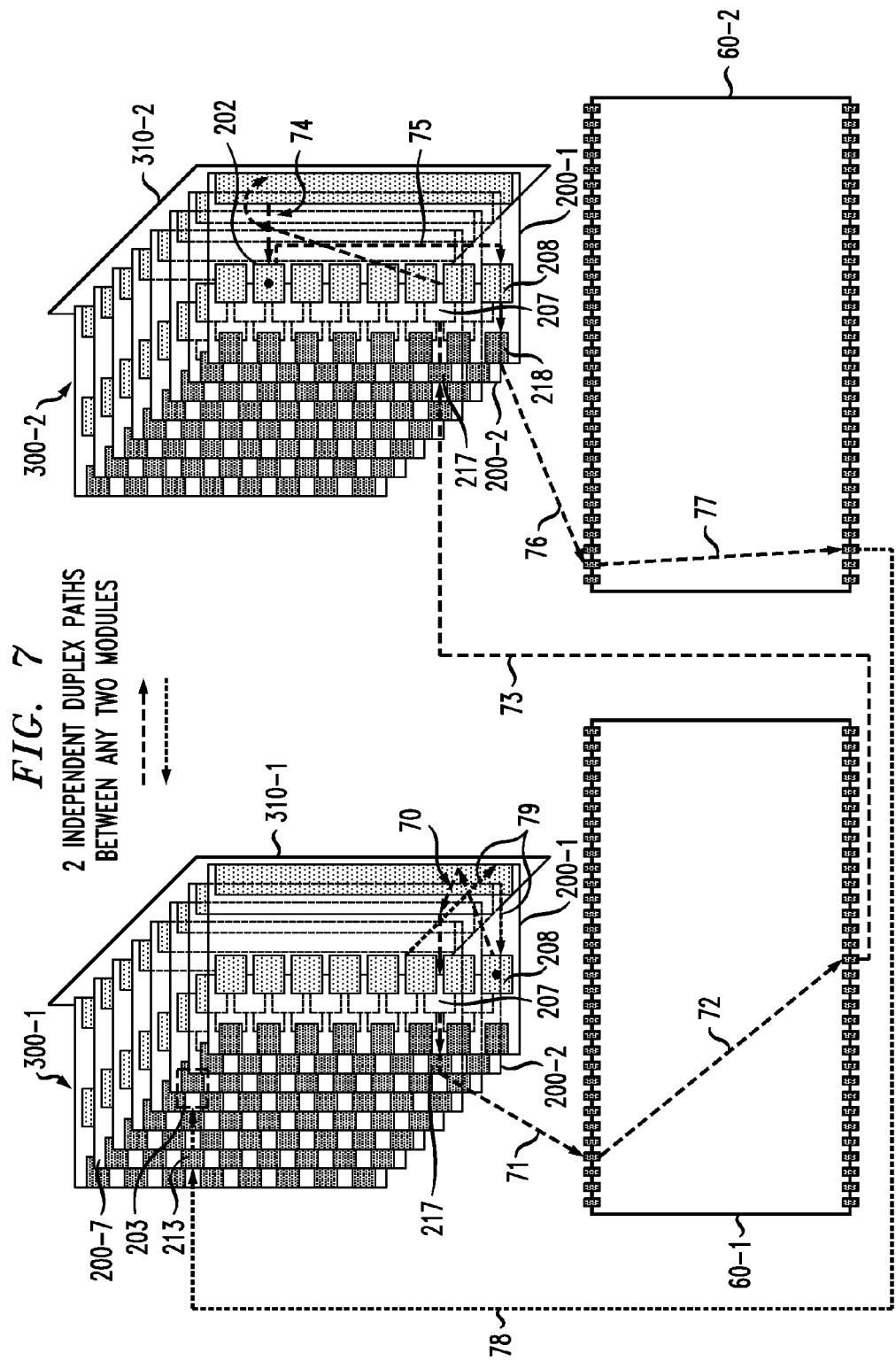
FIG. 7 schematically illustrates optical and electrical communication paths between two nodes in a supercomputer system according to an exemplary embodiment of the invention.

With this arrangement, there are two independent communication paths between any two CPU modules of different backplane modules, and each communication path would require at most three links, i.e., electrical link→optical link→electrical link. Moreover, in one exemplary embodiment, each communication path, comprises 10 Gb/s duplex links between each 64-way backplane module. FIG. 7 schematically illustrates an example of how two different processor modules of different backplane modules in the system may be connected by two independent communication paths, in accordance with an exemplary embodiment of the invention.

For example, as shown in FIG. 7, consider a first processor module 208 (source) of a blade module 200-1 of a first backplane module 300-1, and a second processor module 202 (target) of a blade module 200-1 of a second backplane module 300-2. To establish a communication path between the source processor module 208 (in the first backplane 300-1) and the target processor module 202 (in the second backplane 300-2), starting in the first backplane 300-1, an initial step is to establish a first electrical link from the source processor module 208 to another processor module in the first backplane 300-1 that is optically connected to the second (target) backplane 300-2, which in the example shown in FIG. 7, is the processor module 207 located on the second blade 200-2 of the first backplane 300-1. In particular, as shown in FIG. 7, an electrical link is made from the source processor module 208 to the processor module 207 via electrical wiring connections 70 on the blade modules 200-1 and, 200-2 and backplane connector board 310-1 of the first backplane 300-1, in the manner discussed above with reference to FIGS. 2, 3 and 4.

Next, an optical link is made from the processor module 207 of the first backplane 300-1 to a processor module on the second backplane 300-2, which in the example of FIG. 7, is the processor module 207 on the second blade 200-2 of the second backplane 300-2. This optical link would include the following:

(i) short electrical connections (not shown in FIG. 7) from the processor module 207 to a corresponding optical TX module (not shown in FIG. 7);

(ii) optical ribbon fiber connections (not shown in FIG. 7) from the optical TX module to a first optical connector 217 on the second blade 200-2 of the first backplane 300-1;

(iii) a plurality of optical jumpers 71, 72, and 73 from the first optical connector 217 to a second optical connector 217 on the second blade 200-2 of the second backplane 300-2, which specifically includes an optical connection 71 from the first optical connector 217 to a local optical redistribution box 60-1, an optical connection 72 from a local input to a global output through the local optical redistribution box 60-1, and an optical connection 73 from the local optical redistribution box 60-1 to the second optical connector 217 on the second blade 200-2 of the second backplane 300-2;

(iv) optical ribbon fiber connections (not shown in FIG. 7) from the second optical connector 217 on the second blade 200-2 of the second backplane 300-2 to an optical RX module (not shown in FIG. 7) associated with the processor module 207 on the second blade 200-2 of the second backplane 300-2; and (v) short electrical connections (not shown in FIG. 7) from the optical RX module to the processor module 207.

Next, a second electrical link is made from the processor module 207 on the second blade 200-2 of the second backplane module 300-2 to the target processor module 202 on the first blade module 200-1 of the second backplane 300-2 via electrical wiring 74 on the blade modules 200-1 and 200-2 and backplane connector board 310-2 of the second backplane module 300-2, in the manner discussed above with reference to FIGS. 2, 3 and 4. It is to be noted that the electrical links and optical links are duplex links.

While FIG. 7 schematically depicts a first communication path between the source processor module 208 (of the first backplane 300-1) and the target processor module 202 (on the second backplane module 300-2) using an optical redistribution module 60-1 local to the first backplane module 300-1 (as described above), FIG. 7 further depicts a second communication path between the source processor module 208 and the target processor module 202 (which is independent from the first communication path) using a second optical redistribution module 60-2 that is local to the second backplane module 300-2.

In particular, to establish a second communication path between the source processor module 202 (in the second backplane 300-2) and the target processor module 208 (in the first backplane 300-1), starting in the second backplane module 300-2, an initial step is to establish a first electrical link from the source processor module 202 to another processor module in the second backplane module 300-2 that is optically connected to the target backplane 300-1, which in the example shown in FIG. 7, is the processor module 208 located on the same blade module (first blade module 200-1) of the second backplane module 300-2. In particular, as shown in FIG. 7, an electrical link is made from the source processor module 202 to the processor module 208 (on the same blade module 200-1) via electrical wiring 75 which directly connects the source processor module 202 and the processor module 208 on the same blade module 200-1 of the second backplane 300-2.

Next, an optical link is made from the processor module 208 of the second backplane module 300-2 to a processor module on the first backplane module 300-1, which in the example of FIG. 7, is the processor module 203 on the seventh blade module 200-7 of the first backplane module 300-7. This optical link would include the following:

(i) short electrical connections (not shown in FIG. 7) from the processor module 208 to a corresponding optical TX module (not shown in FIG. 7);

(ii) optical ribbon fiber connections (not shown in FIG. 7) from the optical TX module to a first optical connector 218 on the first blade 200-1 of the second backplane module 300-2;

(iii) a plurality of optical jumpers 76, 77, 78 from the first optical connector 218 to a second optical connector 213 on the seventh blade 200-7 of the first backplane module 300-1, which specifically includes an optical connection 76 from the first optical connector 218 to a local optical redistribution box 60-2, an optical connection 77 from a local input to a global output through the local optical redistribution box 60-2, and an optical connection 78 from the local optical redistribution box 60-2 to the second optical connector 213 on the seventh blade 200-7 of the first backplane module 300-1;

(iv) the optical ribbon fiber connections (not shown in FIG. 7) from the second optical connector 213 on the seventh blade 200-7 of the first backplane module 300-1 to an optical RX module (not shown in FIG. 7) associated with the processor module 203 on the seventh blade 200-7 of the first backplane module 300-1; and (v) short electrical connections (not shown in FIG. 7) from the optical RX module to the processor module 203.

Next, a second electrical link is made from the processor module 203 on the seventh blade 200-7 of the first backplane module 300-1 to the target processor module 208 on the first blade module 200-1 of the first backplane 300-1 via electrical wiring 79 on the blade modules 200-7 and 200-1 and backplane connector board 310-1 of the first backplane module 300-1, in the manner discussed above with reference to FIGS. 2, 3 and 4. It is to be noted that the electrical links and optical links are duplex links.

It is to be understood that FIG. 7 depicts an example of independent communication paths between two processors that include at most two electrical links and one optical link. In other embodiments of the invention, a communication path between two processors of different backplane modules may include a single optical link or may include one electrical link and one optical link. For instance, in the exemplary embodiment of FIG. 7, a communication path from the processor module 207 (source processor) of the second blade 200-2 of the first backplane 300-1 to the processor module 207 (target processor) on the second blade 200-2 of the second backplane 300-2 would require a single optical link, as discussed above. Moreover, in the exemplary embodiment of FIG. 7, a communication path from the processor module 207 (source processor) of the second blade 200-2 of the first backplane 300-1 to the processor module 202 (target processor) on the first blade 200-1 of the second backplane 300-2 would require one optical link and one electrical link, as discussed above with reference to FIG. 7.

Figure 8:
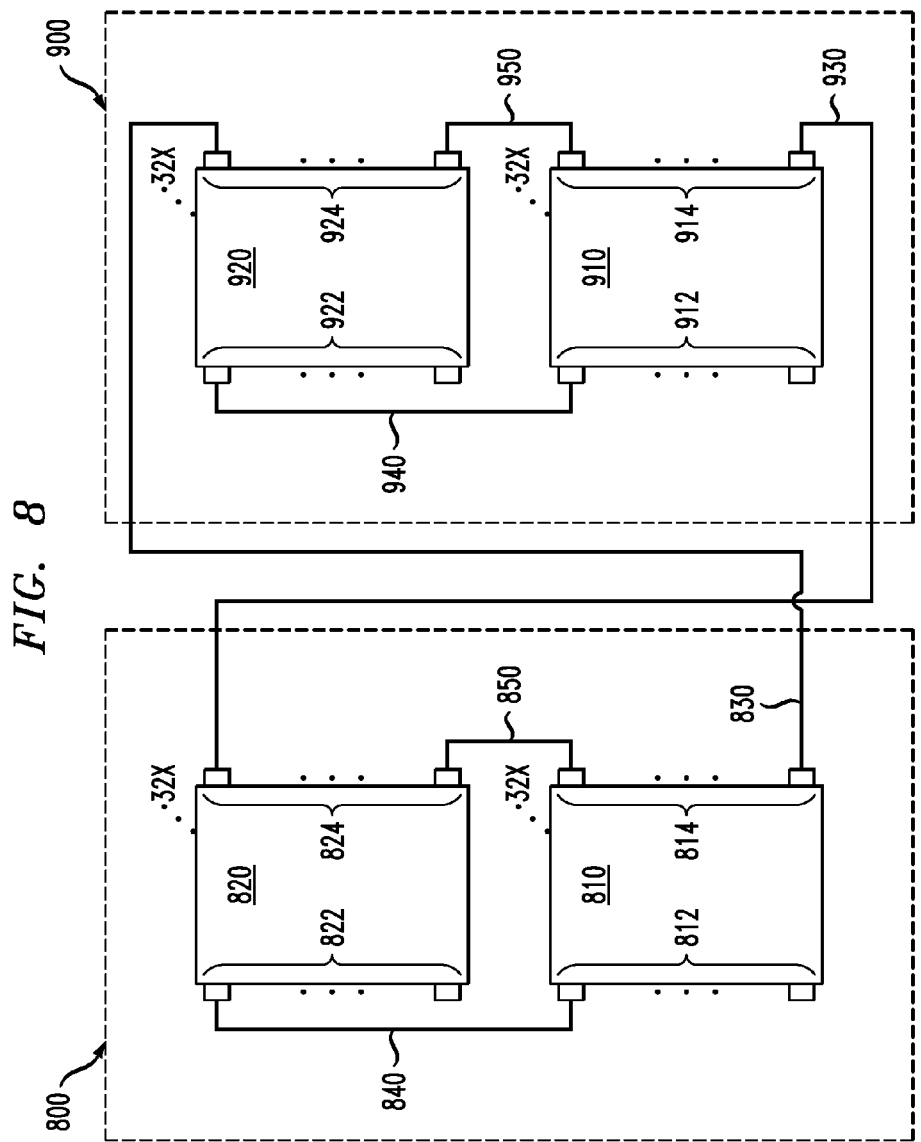
FIG. 8 schematically illustrates optical connections within local and remote clusters and optical connections between local and remote clusters of a supercomputer system, according to an exemplary embodiment of the invention.

FIG. 8 schematically illustrates optical connections within local and remote clusters and optical connections between local and remote clusters of a super computer system, according to an exemplary embodiment of the invention. More specifically, in the context of the exemplary embodiment depicted in FIG. 5 of a 3-rack computing group 50, FIG. 8 schematically illustrates optical connections between optical redistribution boxes and backplane modules within a given (local) 3-rack computing group 50 and optical, connections between the given (local) 3-rack computing group and another (remote) 3-rack computing group. In particular, FIG. 8 schematically illustrates a first three rack group 800 (or local cluster) comprising 32 backplane modules 810 (or local backplane modules) and 32 optical redistribution boxes 820 (or local redistribution boxes), and a second three rack group 900 (or remote cluster) comprising 32 backplane modules 910 (or remote backplane modules) and 32 optical redistribution boxes 920 (or remote redistribution boxes). It is to be understood that both the local cluster 800 and remote cluster 900 represent different computing groups (or three rack groups 50 shown in FIG. 5) of the 32 computing groups forming a supercomputer according to an exemplary embodiment of the invention, wherein the 32 backplane modules 810 in the local cluster 800 and the 32 backplane modules 910 of the remote cluster each represent a combination (16+16) of the backplane modules in compute racks 51 and 52 of a given three rack group 50. When viewed in the context of the local cluster 800 (one three-rack group) there would be 31 remote clusters (or 31 remote three rack groups) although only one remote cluster 900 is shown in FIG. 8.

In the local cluster 800, there are 32 local backplanes 810 and 32 local redistribution boxes 820 (although only one local backplane and local redistribution box are shown). The local backplane 810 comprises 32 local optical connectors 812 and 32 remote (global) optical connectors 814. The local optical redistribution box 820 includes 32 local optical connectors 822 and 32 remote (global) optical connectors 824. Similarly, in the remote cluster 900, there are 32 remote backplanes 910 and 32 remote redistribution boxes 920 (although only one remote backplane and remote redistribution box are shown). The remote backplane 910 comprises 32 local optical connectors 912 and 32 remote (global) optical connectors 914, and the remote optical redistribution box 920 includes 32 local optical connectors 922 and 32 remote (global) optical connectors 924.

More specifically, the local backplane 810 and remote backplane 910 each have a local group of optical connectors and a global group of optical connectors. In each of the local and remote backplanes 810 and 910, 32 nodes of the total 64 processor nodes are optically connected to local redistribution boxes 820 and 920, respectively, via optical bundles 840 and 940, and the other 32 nodes in each of the local and remote backplanes 810 and 910 are connected to global connectors of local and remote redistribution boxes via optical bundles 830, 850, 930 and 950, as discussed in further detail below. In one embodiment, the odd # (or even #) processor modules in die blades would provide "local" bundles and the even # (or odd #) processor modules in the blades would provide "global" bundles. Each node is connected to 32 active duplex optical links (a bundle).

One optical bundle from each of the 32 local backplanes 810 on the local cluster 800 is connected to local input connectors 822 of each of the 32 local optical redistribution boxes 820. This is depicted in FIG. 8, wherein a local optical bundle 840 is shown connected between a local optical connector 812 of the local backplane 830 and a local optical connector 822 of the local optical redistribution box 820. Similarly, one optical bundle from each of the 32 total remote backplanes 910 on the remote cluster 900 is connected to each of the 32 remote optical redistribution boxes 920. This is depicted in FIG. 8, wherein a local optical bundle 940 is shown connected between a local optical connector 912 of the remote backplane 910 and a local optical connector 922 of the remote optical redistribution box 920.

Furthermore, each of the local and remote optical redistribution boxes 820 and 920 output 32 "global" bundles, where each global bundle comprises 32 active duplex optical fiber pairs, wherein each duplex optical fiber pair supports a single 10 Gb/s duplex link from each backplane in the group. Each local backplane 810 in the local cluster 800 receives 32 "global" bundles—one optical bundle from each of the other 31 remote clusters 900 in the system and one from the local cluster 800. This is shown in FIG. 8, wherein a remote optical bundle 830 is shown connected between a remote optical connector 814 of the local backplane 810 and a remote (global) optical connector 924 of the remote redistribution box 920 in the remote cluster 900, and wherein one global optical bundle 850 is shown, connected between a remote optical connector 814 of the local backplane 810 and a remote (global) optical connector 824 of the local redistribution box 820 in the local cluster 800.

Similarly, each remote backplane 910 in the remote cluster 900 receives 32 "global" bundles—one optical bundle from each of the other 31 (remote) clusters in the system and one from the remote cluster 900. This is shown in FIG. 8, wherein a remote optical bundle 930 is shown connected between a remote optical connector 914 of the remote backplane 910 and a remote (global) optical, connector 824 of the local redistribution box 820 in the cluster 800, and wherein one global optical bundle 950 is shown connected between a remote optical connector 914 of the remote backplane 910 and a remote (global) optical, connector 924 of the remote redistribution box 920 in the cluster 900. Overall, FIG. 8 depicts the optical connections between the 64-way backplane modules and optical redistribution boxes within and between the same and different ones of the 32 computing groups of the overall supercomputer system.

It is to be appreciated that a supercomputer according to principles of the invention may be implemented using multiprocessor chips that replace the backplane modules and compute racks. In particular, in one exemplary embodiment of the invention, each compute rack 51 and 52 (which include 16 backplane modules that package 1024 processors (16×64)) can be replaced with a large processor chip having 1024 cores integrated together with optical TX and RX modules that are fabricated on chip using silicon nanophotonic technology. In this manner, a computing group would include two 1024 core processor chips optically coupled to 32 redistribution boxes in the manner described herein.

In accordance with another aspect of the invention, the design provides a highly reliable and highly serviceable system. For example, to support high reliability, the all-to-all optical interconnect provides two independent paths between any two modules. Serviceability is enhanced by using a very modular design where multiple blades are plugged into a common backplane. Optical fiber bulkhead connectors are ail on the front or back of the racks so that they are easily accessible and can be disconnected and reconnected if a blade is replaced.

Although, illustrative embodiments of the invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A computer system, comprising:
 a plurality of multi-processor modules, each multi-processor module comprising a plurality of processors packaged together such that all of the processors in a given multi-processor module are electrically connected to each other in an all-to-all electrical connection network in which any processor in a given multi-processor module is electrically connected to every other processor of the given multi-processor module via an electrical link; and
 a plurality of optical redistribution boxes that are optically coupled to the plurality of multi-processor modules using a network of optical links to provide an all-to-all communication network in which any processor in the computer system is connected to every other processor of the computer system, and wherein a communication path between any processor of any one of the plurality of multi-processor modules and another processor of another one of the multi-processor modules includes at most two electrical links and one optical link.

2. The computer system of claim 1, wherein each of the plurality of multi-processor modules includes M processors, wherein the plurality of multi-processor modules and optical redistribution boxes are packaged into a plurality of P computing groups, wherein each computing group comprises N multi-processor modules and N optical redistribution boxes.

3. The computer system of claim 2, wherein at least one optical redistribution box within a given computing group is connected to at least one multi-processor module within the given computing group and connected to at least one multi-processor module within another computing group.

4. The computer system of claim 2, wherein each of the N optical redistribution boxes of each computing group receives as input N local optical bundles and outputs N global optical bundles and wherein each of the N local and global optical bundles includes M/2 duplex optical links.

5. The computer system of claim 2, wherein M/2=P=N.

6. The computer system of claim 5, wherein M is 64.

7. The computer system of claim 2, wherein each of the N optical redistribution boxes in each P computing group includes N local optical connectors and N global optical connectors, and wherein each of the N multi-processor modules of a given computing group are coupled to each of the N local optical connectors of each of the N optical redistribution boxes of the given computing group, and wherein (N−1) of the global optical connectors of each of the N optical redistribution boxes of the given computing group are coupled to multi-processor modules of each of the other (P−1) computing groups, and wherein one of the global optical connectors of each of the N optical redistribution boxes of the given computing group is connected to one of the N multi-processor modules in the given computing group.

8. The computer system of claim 1, wherein the all-to-all communication network includes two independent optical links between any two multi-processor modules in the system.

9. The computer system of claim 1, wherein the all-to-all communication network provides two independent communication paths between any two processors of any two different multi-processor modules of the supercomputer, with each of the two independent communication paths including at most two electrical links and one optical link.

10. A method for building a computer system, comprising:
 packaging a plurality of processors into a plurality of multi-processor modules, wherein all of the processors in a given multi-processor module are electrically connected to each other in an all-to-all electrical connection network in which any processor in a given multi-processor module is electrically connected to every other processor of the given multi-processor module via an electrical link; and
 connecting the plurality of multi-processor modules using a plurality of optical redistribution boxes that provide a network of optical links to provide an all-to-all communication network in which any processor in the computer system is connected to every other processor of the computer system, and wherein a communication path between any processor of any one of the plurality of multi-processor modules and another processor of another one of the multi-processor modules includes at most two electrical links and one optical link.

11. The method of claim 10, wherein each of the plurality of multi-processor modules includes M processors, wherein the plurality of multi-processor modules and optical redistribution boxes are packaged into a plurality of P computing groups, wherein each computing group comprises N multi-processor modules and N optical redistribution boxes.

12. The method of claim 11, wherein at least one optical redistribution box within a given computing group is connected to at least one multi-processor module within the given computing group and connected to at least one multi-processor module within another computing group.

13. The method of claim 11, wherein each of the N optical redistribution boxes of each computing group receives as input N local optical bundles and outputs N global optical bundles and wherein each of the N local and global optical bundles includes M/2 duplex optical links.

14. The method of claim 11, wherein M/2=P=N.

15. The method of claim 14, wherein M is 64.

16. The method of claim 11, wherein each of the N optical redistribution boxes in each P computing group includes N local optical connectors and N global optical connectors, and wherein each of the N multi-processor modules of a given computing group are coupled to each of the N local optical connectors of each of the N optical redistribution boxes of the given computing group, and wherein (N−1) of the global optical connectors of each of the N optical redistribution boxes of the given computing group are coupled to multi-processor modules of each of the other (P−1) computing groups, and wherein one of the global optical connectors of each of the N optical redistribution boxes of the given computing group is connected to one of the N multi-processor modules in the given computing group.

17. The method of claim 10, wherein the all-to-all communication network includes two independent optical links between any two multi-processor modules in the system.

18. The method of claim 10, wherein the all-to-all communication network provides two independent communication paths between any two processors of any two different multi-processor modules of the supercomputer, with each of the two independent communication paths including at most two electrical links and one optical link.

* * * * *